Jan. 22, 1963

L. HOLMES, JR 3,074,623

HELICOPTER DRIVE

Filed July 6, 1959

Lawrence Holmes, Jr.
INVENTOR.
HERZIG & JESSUP
BY
Edward C. Walsh
Attorney

Jan. 22, 1963 — L. HOLMES, JR — 3,074,623
HELICOPTER DRIVE

Filed July 6, 1959 — 2 Sheets-Sheet 2

Lawrence Holmes, Jr.
INVENTOR.
HERZIG & JESSUP
BY Edward C. Walsh
Attorney

United States Patent Office

3,074,623
Patented Jan. 22, 1963

3,074,623
HELICOPTER DRIVE
Lawrence Holmes, Jr., 867 26th St.,
San Bernardino, Calif.
Filed July 6, 1959, Ser. No. 825,125
6 Claims. (Cl. 230—150)

This invention relates to an improved drive for helicopters. That is, more particularly the invention relates to an improved drive for the rotor of the helicopter whereby a number of distinct advantages are realized.

Helicopters of the prior art are noted for being deficient in that their nature inherently involves complexities. These complexities involve the connection of the driving engine to the rotor and the fact that there is ordinarily involved a counter torque produced by the driving engine which tends to rotate the fuselage of the helicopter in the direction opposite to the rotation of the rotor. This ordinarily requires a counter torque propeller mounted near the tail of the fuselage. Other complexities are involved in the transmission between the driving engine and the rotor. In addition to undue complexity, there is usually inherent in helicopters excessive weight resulting from the complexity and deficiencies in the way of high fuel consumption and sometimes cooling of the engine resulting from the type of driving engine that is usually required.

This invention is adapted in a type of helicopter rotor drive wherein reaction devices, that is, jets, are used at the tips of the rotor blades for driving the rotor. These devices are not, however, internal combustion devices; they utilize simply compressed air which is produced by an air generator driven by the driving engine.

This invention provides an arrangement whereby an ordinary radial type aircraft engine is utilized as the motive force, the engine being mounted to rotate in bearings within the helicopter. The engine drives a fluid compressor, that is, an air generator which itself rotates with the engine and both the engine and compressor being directly connected to the rotor by a column whereby these elements all rotate together as an assembly. The compressor or air generator is of a type designed especially for application in the drive of a helicopter. The rotating impeller of the compressor is mounted on or attached to the shaft of the radial engine and the compressor discharges into the interior of the rotor blades so that the compressed air is discharged through the jets at the tips of the rotor blades to rotate the rotor.

By reason of the novel driving arrangement summarized above, a number of very significant advantages are achieved and realized. The driving system is of unusually low weight. Since there is no counter torque acting on the fuselage of the helicopter, no propeller is needed to counteract any counter torque since none is present. There is no transmission between the driving engine and the rotor since these parts are directly connected. Furthermore, any rotary seals heretofore necessary at the hub of the rotor are completely eliminated. The generation of compressed air and its delivery to the jets is completely within the assembly which rotates as a unit comprising the rotor and the air generator, that is, the compressor. In addition to there being no transmission, no clutch is necessary between the driving engine and the rotor and no free-wheeling mechanism is required.

By reason of the arrangement of the invention, it is possible to use an ordinary radial aircraft engine thus realizing advantages in the way of reduced weight and efficiency in the way of fuel consumption.

The invention has an additional feature in connection with the discharge from the jets at the tips of the rotor blades. A valving arrangement is provided at the hub of the rotor whereby compressed air is discharged only from the jet on the rotor blade which is moving in a direction opposite to the direction of movement of air relative to the helicopter; that is, only from that jet which is actually discharging in the direction opposite to the direction of air supporting the helicopter. This improves the efficiency because the other jet on the opposite rotor blade would be discharging in a direction the same as the direction of air passing the helicopter. Thus, in the latter instance, the relative velocities would be subtractive whereas in the other instance, the relative velocities are additive.

The air generator or compressor is of a type designed especially for application in the drive of a helicopter. The air compressor or generator is of a particular construction whereby a large volume of air at high pressure can be produced, transferred and caused to operate the air jets at the tips of the rotor blades. This particular air generator makes possible realization of further weight advantages since with conventionally known compressors of the centrifugal type, additional weight is involved since these compressors operate at relatively high speeds requiring multiplying gear systems.

In accordance with the foregoing, it is an object of my invention to provide an improved drive for helicopter rotors having the advantage of simplicity of construction, light weight and efficiency of operation.

Another object of my invention is to provide a drive for helicopter rotors comprising a radial engine mounted so as to rotate in bearings in the helicopter, the engine driving a rotary compressor and these elements rotating with the helicopter rotor as a unit with the discharge of the compressor discharging through compressed air jets at the tips of the rotor blades.

Another object of the invention is to provide a helicopter drive as in the foregoing object which eliminates any counter torque in the fuselage, which eliminates the need for a transmission between the engine and the helicopter rotor and which is low in weight.

Another object of the invention is to provide a helicopter drive comprising a driving engine and a compressor mounted to rotate within the helicopter and connected to the helicopter rotor so that these elements rotate as a unit whereby there is no counter torque acting on the helicopter fuselage; the compressor operating to generate compressed air which is utilized as a motive force for driving the helicopter rotor.

A further object of the invention is to provide an air generator or fluid compressor comprising a circular housing having a rotating vane therein adapted to transfer a large volume of air; the housing having an inlet port and an outlet port with a movable barrier therebetween adapted to be moved to allow the vane to pass it, the barrier normally providing a seal between the inlet and outlet ports.

Another object of the invention is to provide a fluid compressor as in the foregoing object wherein the barrier is formed by members which themselves rotate, which normally provide a barrier between the inlet and the outlet ports and which by reason of their rotation permit the said vane to pass them on each revolution of the compressor.

Another object of the invention is to provide an arrangement in the drive of a helicopter rotor having air jets at the tips of the rotor blades wherein compressed air is discharged only from that jet which is discharging in a direction having a component parallel to and in the opposite direction of air passing the helicopter.

Further objects and numerous additional advantages of the invention will become apparent from the following detailed description and annexed drawings wherein:

FIG. 4 is a detail view of the drive mechanism for the rotating members which form the seal between the inlet and outlet ports in the air generator housing; and FIG. 5 is a detail view of the hub of the helicopter rotor showing the valving arrangement for the air jets.

Figure 1:
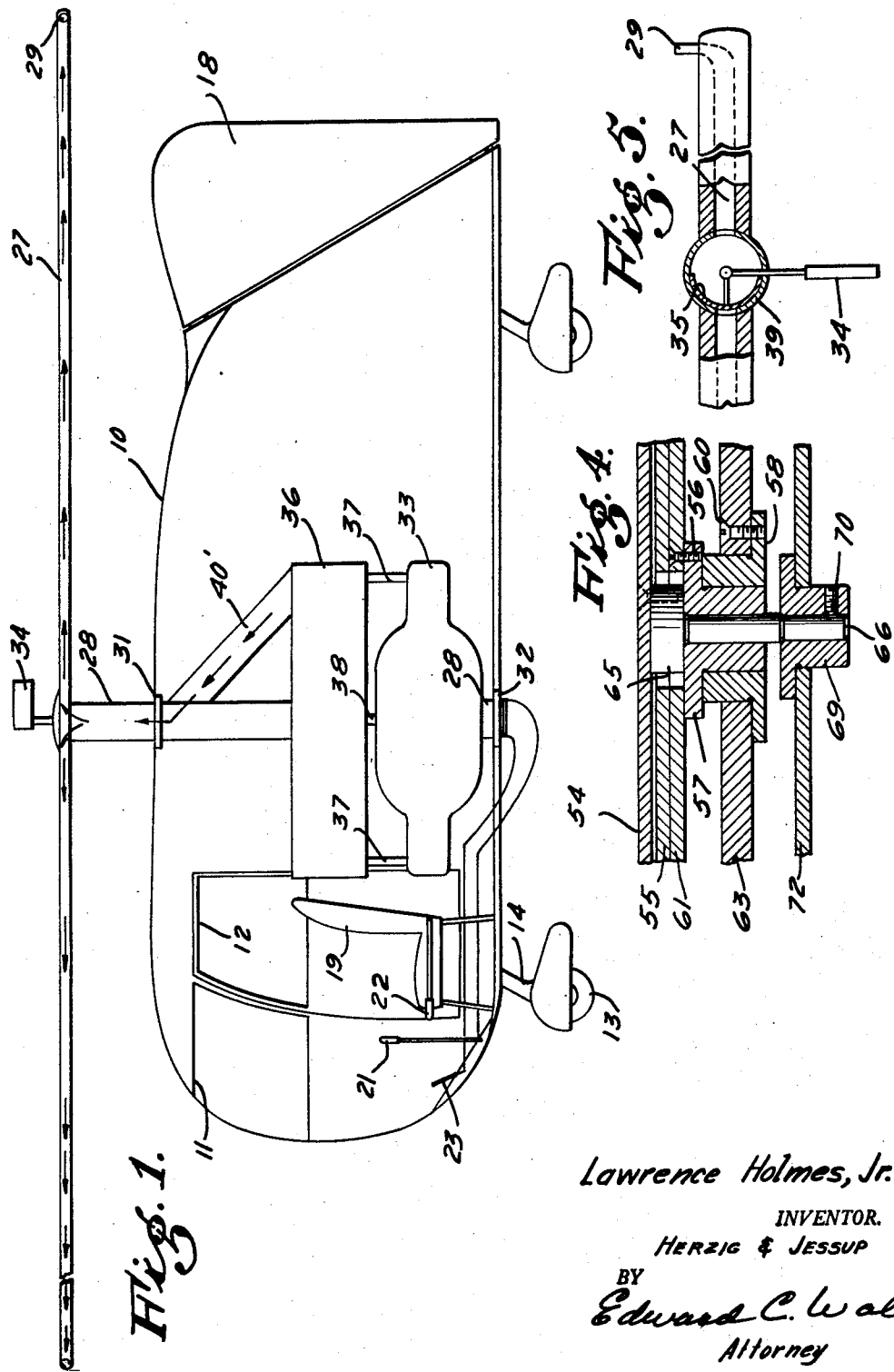
FIG. 1 is a schematic side elevation of a helicopter embodying the drive of my invention therein.

Referring now more in particular to FIG. 1 of the drawings, numeral 10 designates the fuselage of a helicopter which in itself may be of conventional design. The helicopter has windows as indicated at 11 and a door 12 and it has supporting wheels as shown at 13 carried on supports 14. The helicopter has a rudder as shown at 18 and numeral 19 indicates a seat or chair to be occupied by the pilot.

As may be seen in FIG. 1, the rudder 18 is mounted, that is, pivoted on an angle. The hinge mounting of the rudder is at an angle to the vertical as shown. As a result, when the rudder is turned either to the right or to the left, it tilts in such a way as to present or expose a surface to the downwash of the rotor 27. In this manner, by manipulating the rudder even when the helicopter is hovering, that is, stationary as far as longitudinal movement is concerned, it can be turned directionally by moving the rudder to right or left.

The controls as shown in FIG. 1 are the conventional helicopter controls which are operated by the pilot by way of the levers as shown at 21 and 22 and the foot pedal or pedals 23.

Since the engine 33 is itself rotating, the controls to it are by way of rotary joints or couplings such as are already known in the art. Thus, the controls for the engine may operate, for example, by way of telescoping relatively slidable sleeves surrounding the shaft of the engine. By sliding these sleeves longitudinally, such movement may be carried to the interior of the housing of the engine 33 and such movement utilized as necessary within it to actuate the throttle or the ignition etc.

It will be understood as described presently that the rotor embodies cyclic pitch controls and collective pitch controls as conventional and that these operate in the usual way. The engine as will be described is a radial aircraft type engine and the control of the engine by the pilot will be the same as conventional controls of this type.

The helicopter rotor is designated by the numeral 27. It is carried on the end of a vertical, upright or rotary column 28 which extends into the helicopter fuselage. The rotor is of the type which is driven by jets placed at the ends of the rotor blades, these jets being indicated by the numeral 29. These jets discharge compressed air tangentially as respects the rotor blades and drive the rotor around by reaction forces. In the system of this invention, the jets utilize compressed air; there is no internal combustion in the jets. This arrangement of using compressed air is in itself not new in the art and therefore the details of it are not shown or described.

The column 28 is rotatably mounted in journals or bearings 31 and 32 formed in the fuselage of the helicopter.

The engine for driving the rotor is designated at 33. It comprises a radial aircraft engine of conventional type; however, it is mounted so that it is bodily rotatable in the bearings 31 and 32. Numeral 36 designates an air generator or fluid compressor which compresses air which is utilized to drive the rotor 27 as will be described. The air generator 36 is of particular design as will be set forth more in detail presently. The air generator or fluid compressor 36 itself is attached to the engine 33 and rotates with it by way of the standards 37 as shown. The air generator 36 is also mounted on the column 28 as shown. There is within the housing of the air generator 36 an air impeller or vane as will be presently described and this vane is mounted on the shaft 38 of the radial engine 33. The air generator 36 has a discharge port which discharges into a conduit $40^1$ which connects to the column 28 whereby the air can pass vertically up through this column and then pass outwardly radially through appropriate channels formed within the blades of the rotor 27 to reach the air jets 29.

From the foregoing, it will be observed that the engine, the air generator, the rotor column and the helicopter rotor are fixed together and rotate as a unit or assembly. Obviously, therefore, there is no counter torque, that is, no torque tending to rotate the helicopter fuselage itself in a counter direction. The engine 33 rotates in one direction and its shaft 38 carrying the impeller of the air generator 36 rotates in the opposite direction. Therefore, the reaction which is produced by reason of the engine 33 is exerted as a force driving the rotor 27. In other words, the more power that is developed by the engine 33 to compress air in generator 36, the greater will be the reactive effect exerted to directly rotate rotor 27. The compressed air in turn passes through the jets 29 for driving the rotor 27, while the reactive force or counter torque of engine 33 combines with the jet force at the same time adding to the rotative force realized in rotor 27. In other words, the rotor 27 is rotated both by the air jets 29 and directly by the counter torque of the engine 33.

From the foregoing it can be observed that by reason of the rotary momentum of the engine 33, air generator 36, rotor column 28 and rotor 27 considerable kinetic energy will be stored in the entire assembly. This energy is available to drive the rotor, after auto-rotation conditions, to give lift to the helicopter when necessary. For example, in an auto-rotation or power-off landing, when lift is desired, the rotor blades may be adjusted to a positive pitch and the kinetic energy stored in the engine and associated assembly will drive the rotor to provide the needed lift.

FIG. 5 is a detail view of the helicopter rotor showing the valving arrangement whereby compressed air is discharged from only one of the air jets at the tips of the rotor blades. The valving arrangement is controlled by a vane 34 which is rotatable in the manner of a weather vane and assumes a position parallel and downwind to the direction of travel of air through which the helicopter is travelling. The vane 34 is connected to an arcuate baffle or valving member 35 which is within the hub 39 of the helicopter rotor. The member 35 is semicircular in extent so that normally admission of air to the channel in one of the rotor blades is prevented as may be seen. That is, as shown in FIG. 5 the compressed air is only admitted to the right hand rotor blade and to its jet 29 during half of a revolution so that this jet discharges against the direction of travel of the retreating rotor blade causing an increased reaction to the blade by reason of the increased barometric pressure in the immediate area surrounding jet 29; in other words, the jet stream is always directed upwind so that the efficiency of the jet action is increased. Depending on the direction of helicopter travel, i.e., forward, backward, sideways, the vane 34 may assume a position not exactly aligned with the longitudinal center line of the helicopter fuselage. The member 35 is to be adjusted accordingly so that jet 29 of the retreating rotor blade will, to the maximum extent possible, discharge against the direction of travel of air relative to the rotor as a whole. The transition of flow of air from one rotor blade to the other will be half completed at the time the longitudinal axis of the rotor blades is parallel to the direction of helicopter travel, and at such point the air flow will be equally divided between the two blades.

Figure 2:
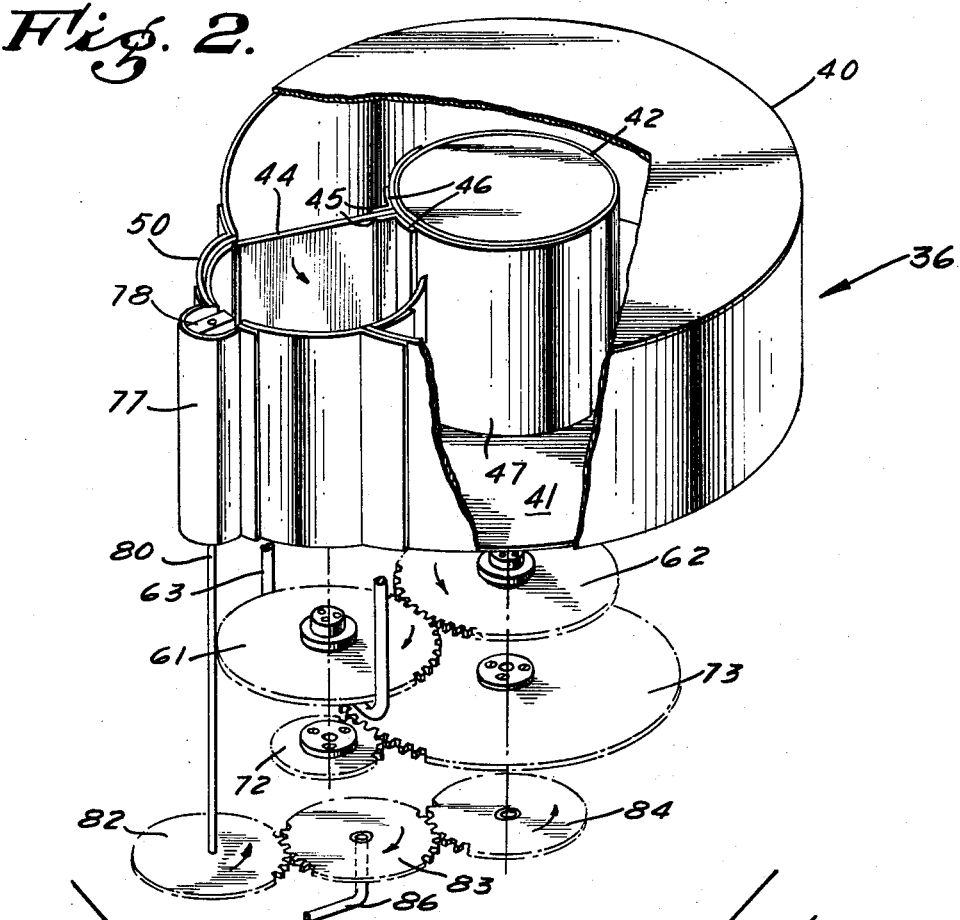
FIG. 2 is a schematic plan view of the air generator or fluid compressor of the invention.
Figure 3:
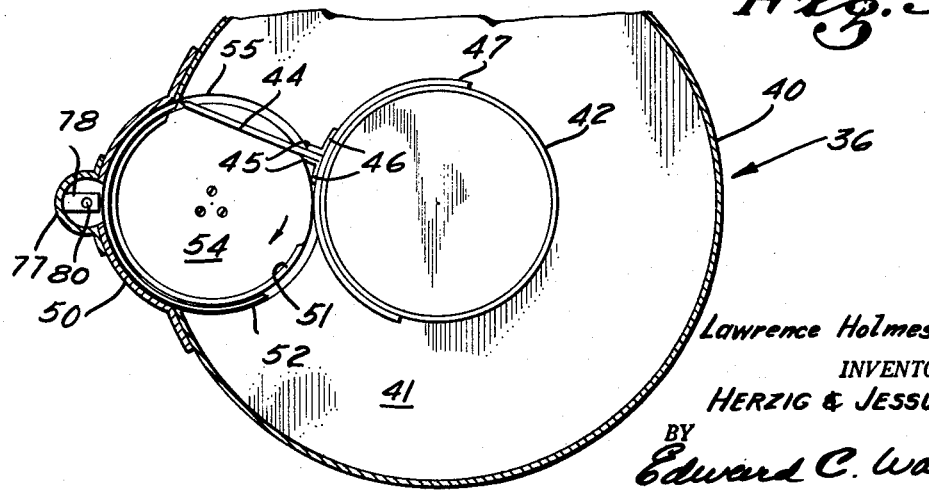
FIG. 3 is a perspective view of the fluid compressor and the drive therefor.

Referring now more particularly to FIGS. 2 and 3 of the drawings these figures show in more detail the fluid compressor 36. This compressor comprises a cylindrical drum or housing 40 having a bottom wall 41.

Disposed centrally of the housing 40 is a cylinder 42 so that an annular space is formed within the housing 40. Traversing this annular space is an impeller vane 44 which is attached to the central cylindrical drum 42 by means of attachment members 45 and 46 as shown. The members 46 are attached by suitable means to a semicylindrical member 47 which attaches to the exterior of the cylinder 42. As shown in the figures the impeller 44 rotates in a counterclockwise direction looking at FIG. 3 sweeping the air ahead of it to compress this air and discharge it from the outlet of the compressor. The housing 40 has an inlet port not shown and an outlet port which discharges to the conduit 40¹ shown in FIG. 1. The cylindrical member 42 is mounted on the shaft 38 of the engine 33 whereas the housing 40 as previously described is attached to the vertical column 23. The impeller vane 44 and the housing 40 rotate in opposite directions as previously described.

Within the housing 40 there is a barrier interposed between the inlet and the outlet ports so that the high pressure in the discharge is sealed off from atmospheric pressure being admitted to the inlet port. The housing 40 has an opening in its side wall which is covered by a member 50 which is arcuate in cross section as shown so that a circular space is formed between the member 50 and the exterior of the central portion 42 of the compressor unit. Numerals 51 and 52 designate rotary barrier members which are contiguous to each other and also to the interior surface of the portion 50; these members continuously rotate about a vertical axis parallel to the shaft 38 within the space as described. The member 51 is of somewhat greater angular extent than the member 52. These members rotate at different speeds as will be described so that except at the time the impeller is passing, a barrier is formed between the inlet and outlet ports of the compressor. The member 51 has a circular floor member 54 and member 52 has a similar circular floor member 55. The floor member 55 is attached to a gear 61 as shown in FIG. 4 which is attached to the flange of a bushing member 57 by a screw 56. This bushing fits within another bushing 58 which is attached by screw 60 to a support bracket 63. The support bracket or yoke 63 is attached to and depends from housing 40 as shown in FIG. 2. In practice, the unit 36 may be counter balanced to offset the weight on the side of the barrier mechanism and its drive. The gear 61 meshes with the gear 62 which is mounted on the shaft 38 of the engine 33. As can be seen, therefore, the gear 61 is driven in a clockwise direction looking at FIG. 2 and since it is attached to the floor of barrier member 52, this member is rotated in the same direction about its axis.

The floor member 54 of rotary member 51 is attached to a circular member 65 at the upper end of a shaft or stem 66 which extends downwardly through and is journalled in the bushings 57 and 58. The floor member 54 is attached to the circular member 65 by screws as shown. The lower end of shaft 66 is secured in the bore of a bushing 69 by a set screw 70 and this bushing is secured to the center of gear 72. Gear 72 meshes with a larger gear 73 which is mounted on the shaft 38 of the engine 33. The gear ratios of the various gears described are such that the rotary member 52 rotates at the same speed as the shaft 38 while the inner rotary member 51 which is driven by the gear 72 rotates at twice the speed of the shaft 38. The housing 40 is of course itself rotating in a direction opposite the direction of rotation of the vane 44. Thus the gears 61 and 72 operate as planetary gears revolving around the gears 62 and 73 as sun gears. This increases the speed of rotation of the arcuate members 51 and 52 about their axes proportionately to the speed of rotation of the housing 40. Thus, the rotation of the arcuate members 51 and 52 remains synchronized with the rotation of the vane 44.

As pointed out, the arcuate members 51 and 52 form a barrier in the housing 40 between its inlet and outlet ports. The action of the arcuate barrier members 51 and 52 is such that by reason of their rotation either one of them or the other is always forming a barrier, except when the impeller is passing, that is a seal, across the annular space within the housing 40 between its outer wall and the inner circular member 42. The purpose of arcuate member 47 is to build up the diameter of member 42 so that the arcuate barrier member 51 of smaller diameter can become tangent to it for completing the seal during the part of the cycle that member 51 is serving this function. Members 51 and 52 permit the vane 44 to pass them on each revolution. For example, with the parts in the position shown in FIG. 3 when the vane 44 moves into the space enclosed within the arcuate members, the member 51 will move around behind the vane 44 to form a barrier across the annular space behind the vane. Arcuate member 51 will move out of the way to let the vane 44 pass. By the time the arcuate member 52 has moved around so as to not form a continuous barrier between the walls of housing 40 and the member 42, the member 51 will have moved into position to complete this barrier. As can be seen, therefore, the barrier is at all times formed on either one side or the other of the circular space enclosed by the arcuate members, except while the impeller is passing.

Referring to the barrier formed by the members 51 and 52, there is a portion of the rotating cycle during which these members are adjacent each other but not adjacent the arcuate portion 50. Thus, to keep the seal effective, provision must be made during this portion of the cycle to provide a barrier between the arcuate member 51 and the interior of the portion 50. This barrier is provided by mechanism now to be described.

On the exterior of the arcuate housing member 50 is another smaller arcuate housing member 77 attached to the arcuate member 50. The housing 77 has within it a rotary member 78 having the cross sectional shape as shown in FIG. 3 having two flat sides and arcuate side as shown moving adjacent the inside of member 77. The member 78 is mounted on a drive shaft 80 as may be seen in FIG. 2. It can be seen that the circular space defined by the interior of the housing 77 is tangent to the exterior of the arcuate member 51. The member 50 has an opening as shown registering with the arcuate housing 77 so that the arcuate lobe of the member 78 can extend through it to form a barrier between arcuate member 51 and the interior of the housing 77.

The member 78 is synchronized with the arcuate members 51 and 52. It rotates at the same speed as the member 52 and in the opposite direction to fill in the space between member 51 and the interior of member 50 as necessary to maintain the seal as described.

The shaft 80 is driven by gear 82 which meshes with the gear 83 in turn meshing with the gear 84 on the shaft 38 of the engine. The gear 83 is journaled on a support bracket 86 extending downwardly from the housing 40 of the compressor 36.

The fluid compressor which compresses the air as described is one that, as can be seen, is capable of transferring a large volume and weight of air at high pressure. The amount of energy that can be converted at the helicopter rotor is dependent on the weight of air that can be discharged at the air jets. The particular compressor shown, therefore, is highly adaptable for the particular application described. The compressor may, of course, be used to compress fluids other than air. Also, it is to be understood that it is within the realm of the invention that an air generator or air compressor of another type could be used in the arrangement of this invention.

From the foregoing, those skilled in the art will observe that the arrangement of this invention achieves all of the advantages and desired results set forth in the opening part of the specification.

The foregoing disclosure is representative of a preferred form of the invention and it is intended that it should be interpreted in an illustrative rather than in a limiting sense. It is the intention that the invention shall be limited only in accordance with the scope of the claims appended hereto which shall be as broad as the state of the art will permit.

I claim:

1. In an air generator in combination: means comprising a circular housing; means comprising a rotatable vane within said housing and adapted to sweep circularly therethrough, said housing having an inlet port and a discharge port; and means comprising a movable barrier interposed between said inlet port and said outlet port in said housing, said barrier comprising concentric arcuate rotatable members, means to rotate said members synchronously with said vane about an axis parallel to the vane axis whereby each of said members rotates to a position to allow said vane to pass them on each revolution of the vane, one or the other of said members always interposing a barrier between the inlet and outlet ports of said housing.

2. In a fluid compressor in combination: means comprising a circular housing, said housing having a central circular portion forming an annular space; means comprising a rotatable vane within said housing adapted to sweep circularly through said annular space, said housing having an inlet port and a discharge port communicating with said annular space; means comprising a barrier interposed between said inlet port and said outlet port in said annular space, said barrier comprising concentric rotatable members which are arc shaped in cross section each having a radial extent to bridge said annular space; and means for driving said rotatable members synchronously with said vane whereby one or the other of said members provides a barrier between said inlet and outlet ports, each of said members having an angular extent to allow said vane to pass them on each revolution.

3. In a fluid compressor in combination: means comprising a circular housing having an annular space therein; means comprising a rotatable vane within the housing adapted to sweep circularly through said annular space, said housing having an inlet port and a discharge port; means comprising a movable barrier in said housing interposed between said inlet port and said outlet port, said barrier comprising concentric contiguously rotatable arcuate members, means to rotate said members synchronously with said vane; and gear driving means associated with the shaft of said vane whereby one of said rotatable members rotates at twice the speed of the other, the members having an angular extent such that the synchronous rotation of the members with said vane allow the said vane to pass said members on each revolution about the center of said housing, the said arcuate members having relative angular displacements whereby to maintain a barrier between said inlet and outlet ports.

4. In an air generator in combination: means comprising a circular housing, means comprising a vane rotatable in said housing and adapted to sweep through an annular space within said housing, said housing having an air inlet port and a discharge port, means interposed between said inlet and outlet ports to form a barrier therebetween within said housing, said barrier means comprising concentric arcuate members rotatable about an axis parallel to the axis of said housing, said arcuate members having openings therein to allow passage of the said vane, means for rotating the arcuate members about their axis synchronously with the vane whereby to allow the vane to pass the arcuate members on each revolution of the vane, and said arcuate members having an angular extent and a phase relationship whereby one or the other of said members always bridges across said annular space to maintain a barrier between the inlet and outlet ports.

5. The apparatus of claim 4 wherein said housing has an extending arcuate side portion shaped to have said barrier means rotate contiguously with the interior side thereof, said arcuate members being contiguous to each other and elongated in a direction parallel to the axis of the housing.

6. The apparatus of claim 4 comprising an additional sealing means including a rotary member and means to synchronously rotate it, said rotary member being positioned to provide a barrier between the said extending side portion of the housing and the inner of said arcuate members when the other arcuate member is not contiguous to it.

References Cited in the file of this patent

UNITED STATES PATENTS

| | | |
|---|---|---|
| 145,382 | Baker | Dec. 9, 1873 |
| 791,147 | Green | May 30, 1905 |
| 805,552 | Vom Hofe | Nov. 28, 1905 |
| 912,549 | Fagan | Feb. 16, 1909 |
| 1,016,199 | Beard | Jan. 30, 1912 |
| 1,072,155 | Pearson | Sept. 2, 1913 |
| 1,268,771 | Randolph | June 4, 1918 |
| 1,368,869 | Whiting | Feb. 15, 1921 |
| 1,562,299 | Cundy | Nov. 17, 1925 |
| 1,648,092 | Whiting | Nov. 8, 1927 |
| 1,701,792 | Nelson | Feb. 12, 1929 |
| 1,942,428 | Hutchison | Jan. 9, 1934 |
| 2,418,793 | Selden | Apr. 8, 1947 |
| 2,741,320 | Ruhle | Apr. 10, 1956 |
| 2,831,543 | Matthews | Apr. 22, 1958 |

FOREIGN PATENTS

| | | |
|---|---|---|
| 27,723 | Great Britain | of 1906 |
| 7,441 | Great Britain | of 1909 |
| 567,472 | France | Dec. 7, 1923 |